US009725164B2

(12) United States Patent
Kelaidis

(10) Patent No.: US 9,725,164 B2
(45) Date of Patent: Aug. 8, 2017

(54) METHOD FOR CONTROLLING ROTORCRAFT AIRFOIL TO MINIMIZE AUXILIARY ROTOR NOISE AND ENHANCE ROTORCRAFT PERFORMANCE

(71) Applicant: AIRBUS HELICOPTERS, Marignane (FR)

(72) Inventor: Manousos Kelaidis, Marseilles (FR)

(73) Assignee: Airbus Helicopters, Marignane (FR)

( * ) Notice: Subject to any disclaimer, the term of this patent is extended or adjusted under 35 U.S.C. 154(b) by 58 days.

(21) Appl. No.: 14/564,437

(22) Filed: Dec. 9, 2014

(65) Prior Publication Data
US 2015/0158580 A1 Jun. 11, 2015

(30) Foreign Application Priority Data
Dec. 10, 2013 (FR) ...................................... 13 02877

(51) Int. Cl.
*B64C 27/00* (2006.01)
*B64C 27/82* (2006.01)
(Continued)

(52) U.S. Cl.
CPC ............ *B64C 27/001* (2013.01); *B64C 13/16* (2013.01); *B64C 27/82* (2013.01); *G05D 1/0858* (2013.01);
(Continued)

(58) Field of Classification Search
CPC .... B64C 2007/8272; B64C 2027/8281; B64C 27/82; B64C 27/58; B64C 13/16;
(Continued)

(56) References Cited

U.S. PATENT DOCUMENTS 4,660,785 A * 4/1987 Munski ................... B64C 27/82
244/17.19
5,102,067 A * 4/1992 Weiner .................... B64C 27/82
244/17.19
(Continued)

FOREIGN PATENT DOCUMENTS

CA 2871223 C 5/2016
CN 2112585 U 8/1992
(Continued)

OTHER PUBLICATIONS

FAA, Helicopter Flying Handbook (FAA-H-8083-21A), Chapter 3—Helicopter Flight Controls, 2012; http://www.faa.gov/regulations_policies/handbooks_manuals/aviation/helicopter_flying_handbook/, accessed Jul. 8, 2016.*
(Continued)

*Primary Examiner* — Tien Dinh
*Assistant Examiner* — Alexander V Giczy
(74) *Attorney, Agent, or Firm* — Brooks Kushman P.C.

(57) ABSTRACT

A rotorcraft extends longitudinally along a first anteroposterior plane separating a first side from a second side of the rotorcraft. The rotorcraft includes at least one main rotor, an auxiliary rotor, and at least one steerable airfoil. The rotorcraft further includes a processor unit connected to a first measurement system configured to measure a current value of a speed parameter (V) of the rotorcraft and to a second measurement system configured to measure a current value of a power parameter (W) of a power plant of the rotorcraft. The processor unit is configured to adjust the deflection angle of the airfoil as a function of the current speed and power parameter values (V, W) to cause the auxiliary rotor to move towards at least one predetermined operating point which optimizes performance of the rotorcraft and minimizes noise generated by the auxiliary rotor.

12 Claims, 3 Drawing Sheets

(51) Int. Cl.
*B64C 13/16* (2006.01)
*G05D 1/08* (2006.01)

(52) U.S. Cl.
CPC *B64C 2027/004* (2013.01); *B64C 2027/8272* (2013.01); *Y02T 50/44* (2013.01)

(58) Field of Classification Search
CPC ....... B64C 13/02; B64C 13/18; B64C 27/001; G05D 1/0858
See application file for complete search history.

(56) References Cited

U.S. PATENT DOCUMENTS

| | | | |
|---|---|---|---|
| 5,188,511 A * | 2/1993 | Ebert | G05D 1/0858 244/17.19 |
| 5,240,205 A | 8/1993 | Allongue | |
| 5,388,785 A | 2/1995 | Rollet et al. | |
| 6,053,452 A | 4/2000 | Yamakawa et al. | |
| 6,142,413 A * | 11/2000 | Dequin | B64C 13/16 244/17.13 |
| 6,290,171 B1 | 9/2001 | Dequin et al. | |
| 7,461,819 B2 | 12/2008 | Eglin | |
| 8,622,334 B2 * | 1/2014 | Drela | B64C 21/06 244/1 N |
| 2012/0104156 A1 | 5/2012 | Groen | |

FOREIGN PATENT DOCUMENTS

| | | |
|---|---|---|
| CN | 1384020 A | 12/2002 |
| CN | 104724285 B | 1/2017 |
| DE | 1144116 | 2/1963 |
| EP | 0556452 A1 | 8/1993 |
| EP | 0566452 | 10/1993 |
| EP | 0556452 B1 | 3/1996 |
| EP | 0867364 A2 | 9/1998 |
| EP | 0867364 A3 | 7/1999 |
| EP | 1547919 | 6/2005 |
| EP | 1547919 A1 | 6/2005 |
| EP | 2883789 B1 | 3/2016 |
| FR | 2338845 | 8/1977 |
| FR | 2769285 A1 | 4/1999 |
| FR | 2864026 A1 | 6/2005 |
| JP | H0616192 A | 1/1994 |
| JP | H10264897 A | 10/1998 |
| JP | 5979798 B2 | 8/2016 |
| KR | 101668830 B1 | 10/2016 |
| RU | 2385262 A | 3/2010 |
| RU | 2601966 C2 | 11/2016 |

OTHER PUBLICATIONS

Japanese Notice of Reasons for Rejection dated Mar. 9, 2016, Application No. 2015-001566, 2 Pages.
Chinese First Office Action dated Mar. 28, 2016, Application No. 201410858258.5, Applicant Airbus Helicopters, 8 Pages.
French Search Report for FR 1302877, Completed by the French Patent Office dated Aug. 13, 2014, 6 Pages.
Russian Decision to Grant dated Jul. 8, 2016 Application No. 2014147694—English translation.

* cited by examiner

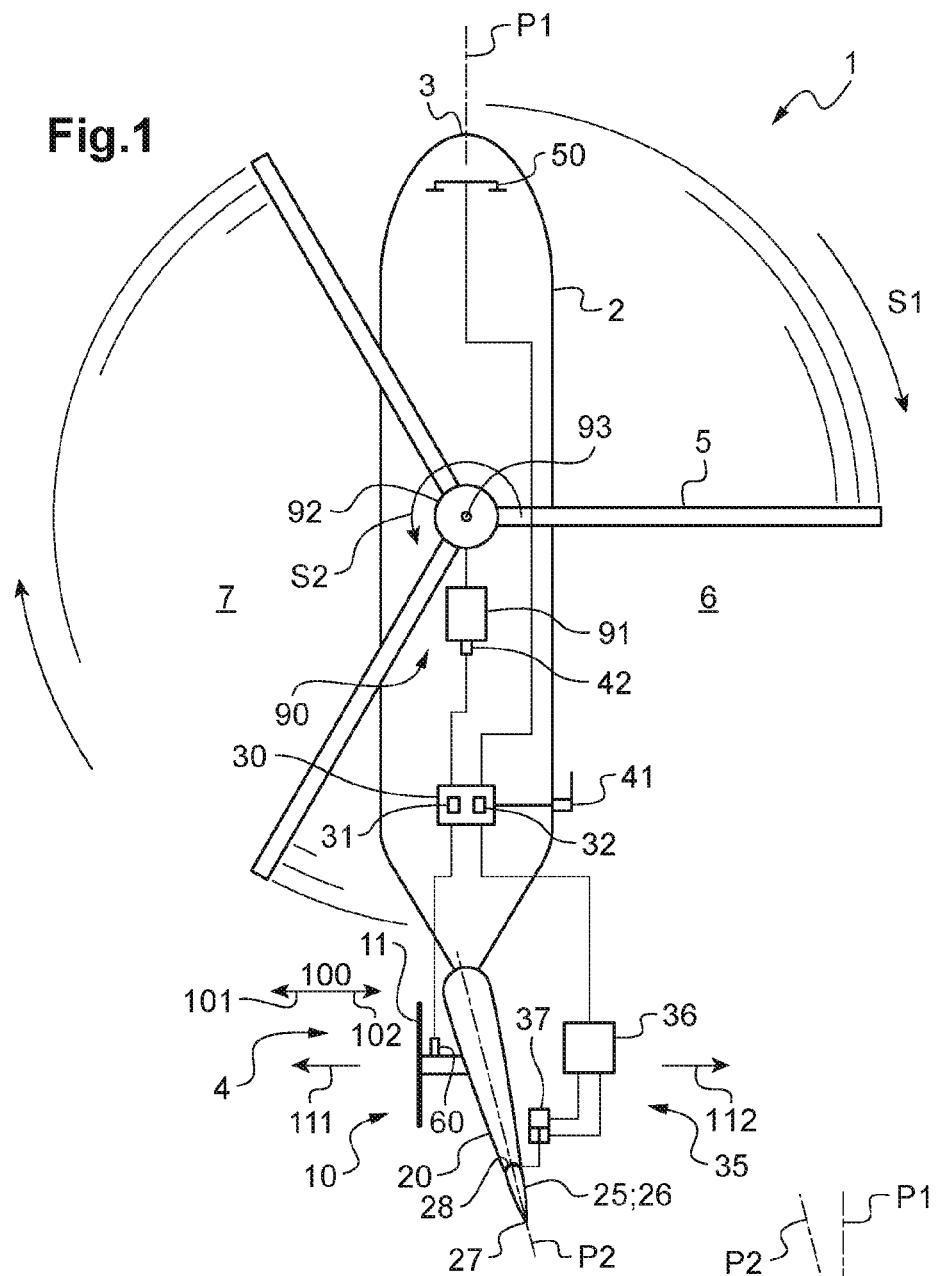
Fig.1
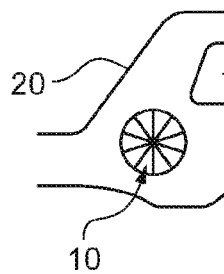
Fig.2
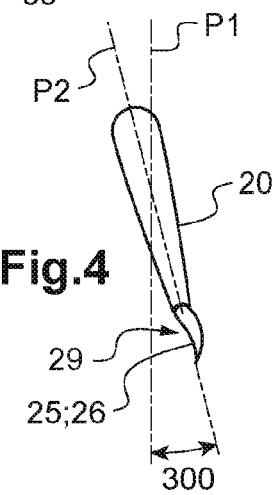
Fig.3
Fig.4

METHOD FOR CONTROLLING ROTORCRAFT AIRFOIL TO MINIMIZE AUXILIARY ROTOR NOISE AND ENHANCE ROTORCRAFT PERFORMANCE

CROSS REFERENCE TO RELATED APPLICATION

This application claims priority to French patent application No. FR 13 02877 filed on Dec. 10, 2013, the disclosure of which is incorporated in its entirety by reference herein.

BACKGROUND OF THE INVENTION (1) Field of the Invention

The present invention relates to a method for tending to optimize both the noise emitted by an auxiliary rotor of a rotorcraft and also the performance of the rotorcraft, and it also relates to a rotorcraft applying the method.

The invention thus lies in the narrow technical field of tail fins for aircraft, and more particularly for rotorcraft.

(2) Description of Related Art

For example, a helicopter type rotorcraft may have a single main rotor that is driven mechanically by at least one engine. The main rotor then provides the helicopter with lift and propulsion.

The helicopter is also provided with an auxiliary tail rotor that performs an anti-torque function by exerting transverse thrust in order to compensate the yaw thrust created by rotating the main rotor. This torque is referred to below as "rotor torque" for convenience.

Furthermore, the auxiliary rotor enables the pilot to control the yaw movements of the helicopter by exerting transverse thrust that is positive or negative.

The auxiliary rotor may then for example be arranged on a tail fin carried by a tail boom of the aircraft. The term "fin" designates a streamlined body extending in elevation and that is substantially contained in a vertical plane. Nevertheless, the fin may be inclined relative to this vertical anteroposterior plane of symmetry. The term "vertical fin" is sometimes used.

An unducted auxiliary rotor is known, and for convenience is referred to below as a "conventional" auxiliary rotor. Conventionally, an unducted auxiliary rotor is mounted laterally at a top end of the tail fin.

Such an unducted auxiliary rotor is in widespread use. Nevertheless, it is possible to implement an auxiliary rotor that is ducted, as known under the trademark Fenestron®, for example.

A ducted auxiliary rotor comprises a rotor arranged in a duct provided through the tail fin of a helicopter. The axis of symmetry of the duct is substantially perpendicular to the vertical anteroposterior plane of symmetry of the helicopter.

Consequently, the streamlined shape of the vertical fin of the helicopter surrounds said duct and thus the auxiliary rotor. It should be observed that the streamlined structure is commonly referred to by the person skilled in the art as a fairing. Such a rotor is referred to for convenience below as a "ducted" rotor.

Independently of the ducted or unducted nature of the auxiliary rotor, the tail fin participates in controlling yaw movements. The fin generates transverse lift while the helicopter is in forward flight. The greater the forward speed of the helicopter, the greater this transverse lift.

A ducted or unducted auxiliary rotor thus makes it possible to control yaw movements of a rotorcraft. Nevertheless, an auxiliary rotor can generate a greater or smaller amount of noise depending on the stage of flight of the rotorcraft.

Document FR 2 338 845 refers to a helicopter having a rotor driven by an engine.

Document FR 2 338 845 then provides for controlling the helicopter in yaw by means of a fixed-pitch ducted propeller driven by the engine, with the thrust of that propeller being modulated by variable-pitch vanes situated in a duct of the propeller and upstream therefrom. The auxiliary rotor is thus a ducted rotor provided with a propeller and with vanes arranged in the duct of the ducted rotor.

Document EP 0 867 364 suggests reducing the noise emitted by a rotorcraft by reducing the speed of rotation of a main rotor, and by controlling accordingly an auxiliary rotor and a movable fin element. The pitch of the blades of the auxiliary rotor and the angle of attack of the movable fin element are determined on the basis of an air speed and of the torque exerted by the main rotor.

Document U.S. Pat. No. 6,290,171 provides for a device for controlling a hybrid anti-torque system for opposing the torque generated by a main rotor for providing a helicopter with lift and propulsion, and comprising:

an anti-torque auxiliary rotor that is controllable and that exerts anti-torque lateral thrust; and at least one steering airfoil that is controllable and that generates anti-torque transverse thrust.

That device includes control means:

for controlling as a priority said airfoil so that it generates lift that is representative of at least a portion of a first control order, which portion is suitable for being executed by said airfoil; and for controlling said auxiliary rotor so that the combined action of said airfoil and of said auxiliary rotor is representative of a yaw control order for the helicopter.

Document EP 1 547 919 describes a method and a device for reducing the vibration generated by the structure of a helicopter. That vibration results from the flow of air coming from a main rotor that provides the aircraft with lift and propulsion, and from the flow of air running along the fuselage. The method and the device then make use of a measurement of vibration in order to determine the angle of incidence of a tail fin in order to generate a force in opposition to the measured vibration.

Document EP 0 566 452 describes a helicopter having a single main lift and propulsion rotor, together with an anti-torque system. The anti-torque system comprises:

an anti-torque auxiliary rotor driven in rotation from engine means for said main rotor and exerting controllable anti-torque lateral thrust; and at least one steering airfoil of controllable deflection for generating anti-torque transverse lift.

Under such circumstances, the helicopter includes means for automatically controlling the deflection angle of said steering airfoil as a function of the collective pitch angle of said main rotor and as a function of the forward speed of said helicopter.

Finally, Document DE 1 144 116 describes a fin carrying an auxiliary rotor and a control surface capable of being pivoted.

Also known is Document US 2012/104156.

BRIEF SUMMARY OF THE INVENTION

An object of the present invention is thus to propose a method for tending to optimize the noise emitted by an auxiliary rotor of a rotorcraft.

The invention thus provides a method for tending to minimize the noise emitted by an auxiliary rotor of a rotorcraft. The rotorcraft extends longitudinally along a first anteroposterior plane between a first side and a second side of the rotorcraft. The rotorcraft thus extends laterally from the first side to the second side.

In addition, the rotorcraft is provided with at least one main rotor, the rotorcraft also having an auxiliary rotor exerting controllable lateral thrust for controlling movement of the rotorcraft in yaw. The thrust is then directed towards the second side in order to counter torque generated by said main rotor on the fuselage of the rotorcraft. The term "thrust directed towards the second side" is used to mean thrust acting in a direction going from the auxiliary rotor towards the second side.

The rotorcraft also has a power plant for driving the main rotor and the auxiliary rotor in rotation.

The rotorcraft also has a tail fin provided at least in part with a steerable airfoil extending in elevation and generating transverse thrust, the airfoil presenting a deflection angle of zero when the airfoil is present in a reference plane referred to as the "second" plane, the airfoil having a trailing edge. The airfoil thus comprises a body that is defined in a chord direction between a leading edge and a trailing edge.

The airfoil thus extends vertically from a low portion towards a high portion, and longitudinally from a leading edge towards a trailing edge. The term "when said airfoil is present in a reference plane referred to as a "second" plane" is used to designate the position in which the airfoil is to be found when a reference chord of the airfoil is present in the second plane.

In this method, the deflection angle of the airfoil is controlled so as to direct its trailing edge towards said second side so that the airfoil presents a deflection angle that is negative relative to the second plane, or to direct its trailing edge towards said first side so that the airfoil presents a deflection angle that is positive relative to the second plane, the airfoil having the function of causing the auxiliary rotor to tend towards at least one predetermined operating point seeking to optimize the performance of the rotorcraft and to minimize the noise generated by the auxiliary rotor, the deflection of said airfoil being controlled at least as a function of a current value of a speed parameter of the rotorcraft and of a current value of a power parameter of said power plant.

By convention, the deflection angle is considered as being:
  zero when the airfoil is situated in the second plane;
  positive when the airfoil is offset angularly relative to the second plane by being turned towards the first side; and
  negative when the airfoil is offset angularly relative to the second plane by being turned towards the second side.

Furthermore, by convention it is considered that a positive deflection angle is greater than a negative deflection angle.

Consequently, the airfoil may perform pivoting movements to present a deflection angle lying between a minimum negative deflection angle and a maximum positive deflection angle.

In the method, this deflection angle is controlled so as to cause the auxiliary rotor to tend towards at least one operating point that minimizes the noise generated by the auxiliary rotor. The airfoil thus enables the auxiliary rotor to be put under conditions seeking to reduce the sound nuisance and to improve the performance of the aircraft.

The deflection angle is controlled to optimize the thrust generated by the auxiliary rotor from the point of view of acoustic comfort, while nevertheless conserving performance for the rotorcraft that is acceptable.

As a result, the thrust from the auxiliary rotor is adapted as a function of the angular position of the airfoil. This adaptation seeks to cause the auxiliary rotor to tend towards optimum operating points. The airfoil thus enables the thrust generated by the auxiliary rotor to be increased or reduced in order to satisfy as well as possible both a performance target for the rotorcraft and also an acoustic target.

In order to control the deflection angle of the airfoil, the method makes use of the current value of a speed parameter of the rotorcraft and of the current value of a power parameter of said power plant.

The method applies equally well to a ducted auxiliary rotor and to an unducted auxiliary rotor.

The method may include one or more of the following characteristics.

Thus, by way of example, said speed parameter is selected from a list comprising at least: an air speed and a ground speed.

These air and ground speeds are measured using a conventional first measurement system. For example, the air speed may be determined with the help of a Pitot tube. Furthermore, the ground speed may be obtained with a positioning system known under the acronym GPS, or indeed by using Doppler radar, for example.

By way of example, the power plant includes at least one engine and a main gearbox interposed between each engine and the main rotor, and the power parameter may be selected from a list comprising at least: total power developed by said at least one engine; total torque generated by said at least one engine; power transmitted to the main gearbox; torque transmitted to the main gearbox; and torque exerted on a mast driving said main rotor.

These power parameters of the power plant may be measured with the help of a conventional second measurement system. This second measurement system may be a conventional system having the function of determining either power as such, or else torque as a function of the nature of the parameter.

The second measurement system may thus comprise a first device for measuring torque transmitted by a rotating shaft. For example, the first device may be a torque meter having phonic wheels.

When the power parameter is power as such, the second measurement system may also include a second device measuring a speed of rotation of said shaft, e.g. a device such as a phonic wheel.

The second measurement system may also include a calculation unit. The calculation unit then determines the power by multiplying said torque by said speed of rotation.

Furthermore, the rotorcraft may have arranged thereon a tail fin constituted entirely by said airfoil, or by a stationary tail fin provided with at least one movable control surface representing said airfoil, or indeed by a movable tail fin provided with at least one movable control surface, together representing said airfoil. In other words, the airfoil may be a steerable tail fin, possibly also having a steerable control surface, or indeed a steerable control surface arranged on a stationary tail fin.

In addition, in the invention it is possible:
  to position said airfoil at a small negative deflection angle during a stage of descending flight at a low speed for the rotorcraft, e.g. an angle lying in the range −15 degrees to 0 degrees;

to position said airfoil at a large negative deflection angle during a descending stage of flight at a high speed of the rotorcraft or when it is in auto-rotation, e.g. an angle of −15 degrees; and to position said airfoil at a positive deflection angle during a climbing stage of flight, e.g. at an angle of 35 degrees.

When the airfoil presents a negative deflection angle, the lateral lift from the tail fin is reduced in order to reduce the torque that adds to the torque exerted on the fuselage by the main rotor. In order to compensate for this reduction in torque, it is appropriate to increase the thrust generated by the auxiliary rotor in order to keep the yaw angle of the aircraft constant.

Conversely, when the airfoil presents a positive deflection angle, the lateral lift from the tail fin is increased. In order to compensate for this increase in torque, it is appropriate to reduce the thrust generated by the auxiliary rotor.

Under such conditions, the method tends to optimize the performance of a rotorcraft and the noise emitted by the rotorcraft during multiple stages of flight.

During a cruising stage of flight, a tail fin of a rotorcraft may generate lateral thrust capable of creating torque suitable for compensating the torque exerted by the main rotor on the fuselage.

The auxiliary rotor may then optionally be stopped. Nevertheless, a ducted auxiliary rotor may then give rise to a noisy phenomenon of fluid recirculating within the duct of the ducted auxiliary rotor.

The invention then proposes placing the airfoil at a negative deflection angle in order to reduce the lateral thrust from the tail fin while requesting operation of the auxiliary rotor. The phenomenon of fluid recirculation is then at least reduced.

This method appears to be surprising insofar as it leads to the auxiliary rotor being operated even though that appears to be penalizing. Nevertheless, a small negative angle serves to minimize the power required from operation of the auxiliary rotor, thereby conserving acceptable performance.

Furthermore, the method makes it possible to use a tail fin of large dimensions, by minimizing the impact of the fin on the noise that is emitted during a cruising stage of flight. Such a tail fin is advantageous. The tail fin contributes to the anti-torque action of the auxiliary rotor and may thus optionally enable an auxiliary rotor to be installed that requires less power than in certain prior art embodiments. The power saving that results therefrom can lead to an increase in the payload of the rotorcraft.

Fuel consumption can also be optimized.

During a descending stage of flight, a tail fin of large dimensions can generate a large amount of lateral thrust that is substantially equivalent to the lateral thrust developed during cruising flight. Nevertheless, the torque from the rotor tends to diminish. Under such circumstances, this lateral thrust may generate torque on the fuselage that is greater than the rotor torque exerted on the fuselage by the main rotor. This results in a yaw movement of the rotorcraft that needs to be countered by generating negative thrust using the auxiliary rotor in order to maintain a constant yaw angle for the aircraft.

Such negative thrust generates noise, and may degrade the performance of the rotorcraft, in particular by making it more difficult for a pilot to control.

The invention thus proposes positioning the airfoil at a deflection angle that is large and negative so as to avoid creating torque greater than the rotor torque.

The airfoil may also be used for this purpose during a stage of flight in auto-rotation.

The rotor torque exerted by the main rotor on the fuselage is then low. Under such circumstances, the airfoil may be positioned at a large negative deflection angle in order to induce lateral thrust from the tail fin that is small or even zero.

In auto-rotation, and also during a rapid descent, the auxiliary rotor is used mainly for controlling the yaw movement of the aircraft and not for countering any lateral thrust generated by a tail fin. The invention thus provides an optimized margin for controlling yaw by using the auxiliary rotor. Furthermore, the noise emitted by the auxiliary rotor can then be reduced, in particular by avoiding operation with negative thrust.

During a climbing stage of flight, the main rotor is heavily stressed so it induces a large amount of rotor torque on the fuselage. This rotor torque is conventionally countered by generating a large amount of thrust from the auxiliary rotor. This high level of thrust generates noise.

In addition, operating the auxiliary rotor then requires a large amount of power. The power available for the main rotor is then reduced, thereby reducing the performance of the rotorcraft, and in particular reducing its rate of climb.

Conversely, the invention proposes positioning the airfoil at a positive deflection angle during a climbing stage of flight. The auxiliary rotor then needs to generate a smaller amount of thrust compared with certain prior art embodiments, thereby enabling the above-mentioned drawbacks to be reduced.

In addition, the airfoil may also be positioned at a positive deflection angle in the event of a failure of the auxiliary rotor. The torque generated by the airfoil on the fuselage enables a greater amount of rotor torque to be compensated. The invention thus makes it possible to reduce the speed of descent of the aircraft. Specifically, the invention makes it possible to reduce the forward speed of the aircraft during a running landing as needs to be performed after descending in the event of a failure of the auxiliary rotor.

Furthermore, it is possible to incline the second plane relative to the first anteroposterior plane so that the second plane presents a positive angle relative to the first anteroposterior plane, the trailing edge of the airfoil being directed towards the first side when the airfoil is present in the second plane.

This characteristic makes it possible to impart a positive angle to the airfoil relative to incident air during forward flight when the airfoil has a zero deflection angle.

Likewise, it is also possible to impart positive camber to the airfoil, the airfoil presenting a cambered face directed towards the second side.

Furthermore, it is possible to control the orientation of the airfoil with the help of a relationship providing a target angle for the airfoil as a function of said speed parameter of the rotorcraft and of said power parameter of the power plant.

This relationship optionally includes the following equations:

$$\delta_1 = \begin{cases} V < V_1 \to \delta_{max} \\ V_1 \leq V < V_2 \to [sw] \cdot (A \cdot V + B) + \\ [\delta_{max} - [sw] \cdot (A \cdot V + B)] \cdot \left\{ 1 - \left[ \sin\left(\frac{\pi}{2} \cdot \frac{V - V_1}{V_2 - V_1}\right) \right]^2 \right\} \\ V_2 \leq V \to [sw] \cdot (A \cdot V + B) \end{cases}$$

$$\delta_2 = \begin{cases} W < W_1 \to \delta_{min} \\ W_1 \leq W < W_2 \to \delta_1 - [\delta_1 - \delta_{min}] \cdot \left\{ \left[ \sin\left(\frac{\pi}{2} \cdot \frac{W - W_2}{W_2 - W_1}\right) \right]^2 \right\} \\ W_2 \leq W \to \delta_1 \end{cases}$$

-continued $$\delta = \begin{cases} V > V_4 \to \delta_2 \\ V_3 < V \le V_4 \to \delta_{max} - \\ [\delta_{max} - \delta_2] \cdot \left\{ \left[ \sin\left(\frac{\pi}{2} \cdot \frac{V - V_3}{V_4 - V_3}\right) \right]^2 \right\} \\ V \le V_3 \to \delta_{max} \end{cases}$$

where:
"δ" represents the target angle;
"δ1" and "δ2" represent calculation parameters;
"δmax" and "δmin" represent respectively the predetermined maximum positive threshold angle and minimum negative threshold angle;
"V1" represents the first speed threshold, "V2" represents the second speed threshold, "V3" represents the third speed threshold, and "V4" represents the fourth speed threshold;
"V" represents the current value of the speed parameter;
"W1" represents the first power threshold and "W2" represents the second power threshold;
"W" represents the current value of the power parameter;
"sw" represents a predetermined adjustment parameter; and
"A" and "B" represent variables that are functions of said adjustment parameter.

Where, by way of example, "δmax", "δmin", "V1", "V2", "V3", "V4", and "W1", "W2" are determined by the manufacturer performing tests and/or simulations so as to match them to a particular rotorcraft and/or to a particular mission.

The variables "A" and "B" are determined by the manufacturer by tests or by simulation in order to induce the predetermined threshold angle. For example, these variables "A" and "B" may be determined using the following formulas:

$A=0.1\times[sw]$ and $B=-21\times[sw]$

In a first implementation, the adjustment parameter is equal to a predetermined value. The deflection angle applied to the airfoil is then equal to the target angle.

By way of example, the predetermined angle may be zero.

The relationship makes it possible to define a single sheet for determining the deflection angle as a function of the current speed parameter and of the current power parameter.

This sheet may in particular have four distinct operating zones that are interconnected by transition zones, namely:

a first zone Z1 for which the deflection angle is at a maximum, reaching a positive threshold angle, the first zone being reached at a low forward speed;

a second zone Z2 for which the deflection angle is at a maximum reaching a positive threshold angle, the second zone being reached at an intermediate forward speed and at high power developed by the power plant;

a third zone Z3 for which the deflection angle is positioned at a medium deflection, e.g. close to zero or equal to zero, the third zone being reached at a high forward speed and at high power developed by the power plant; and a fourth zone for which the deflection angle is small, reaching the negative threshold value, the fourth zone being reached at a high forward speed and at low power developed by the power plant.

The medium deflection lies between the positive threshold angle δmax and a negative threshold value δmin.

In a second implementation the following steps are performed:

determining a maximum angle for the target angle in application of said relationship and imparting a first value to the adjustment parameter, e.g. a first value equal to −1;

determining a minimum angle for the target angle in application of said relationship and imparting a second value to the adjustment parameter, e.g. a second value equal to +1;

measuring a current collective pitch of the blades of said auxiliary rotor;

increasing said deflection angle of the airfoil by causing it to tend towards said maximum angle so long as said pitch is greater than a predetermined setpoint pitch, the deflection angle being limited to be less than or equal to the maximum angle;

decreasing said deflection angle of the airfoil by causing it to tend towards said minimum angle so long as said pitch is less than the predetermined setpoint pitch, the deflection angle being limited to be greater than or equal to the minimum angle; and automatically modifying said pitch in parallel with modifying said deflection angle.

The relationship makes it possible to define an upper sheet and a lower sheet serving respectively to determine a maximum angle and a minimum angle. Each sheet may include the four above-described zones.

The deflection angle of the airfoil is then limited by these upper and lower sheets.

Under such circumstances, the deflection angle is determined as a function of the current collective pitch of the blades of the auxiliary rotor, while nevertheless being limited by the upper and lower sheets.

This second implementation seeks to cause the auxiliary rotor to operate at a predetermined operating point. The manufacturer then determines the pitch of the blades that will bring the auxiliary rotor into this operating point.

This operating point can lead to the auxiliary rotor generating positive lateral thrust.

When the collective pitch of the blades is greater than the setpoint pitch, the lateral lift from the tail fin is increased by increasing the deflection angle, i.e. by making it tend towards the maximum angle. In parallel, an autopilot system acts on the auxiliary rotor to reduce the collective pitch of the blades of the auxiliary rotor.

When the collective pitch of the blades is less than the setpoint pitch, the lateral thrust from the tail fin is reduced by reducing the deflection angle, i.e. by making it tend towards the minimum angle. In parallel, an autopilot system acts on the auxiliary rotor to increase the collective pitch of the blades of the auxiliary rotor.

In addition, for an aircraft including manual control means for controlling the pitch of the blades of the auxiliary rotor, it is possible to inhibit any modification to the deflection angle whenever the pilot is operating said control means. The second implementation is then inhibited.

It should be observed that a single rotorcraft may use both of the above-described implementations, with it being possible for a pilot to select the desired mode of operation.

In addition to a method, the invention provides a rotorcraft extending longitudinally along a first anteroposterior plane separating a first side from a second side of the rotorcraft, said rotorcraft being provided with at least one main rotor, said rotorcraft being provided with an auxiliary rotor exerting lateral thrust that is controllable in order to control yaw movement of the rotorcraft, said thrust being directed towards said second side in order to counter torque generated by said main rotor on a fuselage of the rotorcraft, said rotorcraft including a power plant for driving the main rotor and the auxiliary rotor in rotation, said rotorcraft including a tail fin extending in elevation and provided at least in part with a deflectable airfoil of controllable deflection and generating transverse lift, said airfoil presenting a zero deflection angle when said airfoil is present in a second plane, said airfoil having a trailing edge.

The rotorcraft then includes a processor unit connected to mover means for causing the airfoil to pivot, the processor unit being connected to a first measurement system for measuring a current value of a speed parameter of the rotorcraft and to a second measurement system for measuring a current value of a power parameter of said power plant, said processor unit then applying the above-described method.

Consequently, the processor unit may include calculation means such as a processor executing instructions stored in a non-volatile memory in order to perform the method.

The processor unit thus communicates with the mover means for controlling the deflection of the airfoil by directing its leading edge towards the first side so that the airfoil presents a deflection angle that is positive relative to the second plane or by directing its trailing edge towards the second side so that the airfoil presents a deflection angle that is negative relative to the second plane. For this purpose, the processor unit controls the deflection angle of said airfoil at least as a function of a current value of a speed parameter of the rotorcraft and of a current value of a power parameter of said power plant.

The rotorcraft may then include a deflectable tail fin representing said airfoil, or a stationary tail fin provided with at least one movable control surface representing said airfoil, or a movable tail fin having at least one movable control surface together representing said airfoil.

In addition, the second plane may present a positive angle relative to the first anteroposterior plane, said trailing edge being directed towards said first side when said airfoil is present in said second plane.

Furthermore, the airfoil may have positive camber, said airfoil presenting a cambered face directed towards the second side.

In addition, the processor unit may include a non-volatile memory storing a relationship providing a target angle for the airfoil as a function of the speed parameter of the rotorcraft and of the power parameter of the power plant in order to perform the first and/or the second above-described implementation.

The rotorcraft may also include manual control means for controlling the pitch of the blades of the auxiliary rotor, and the control means being in communication with the processor unit directly or indirectly via measurement devices.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a diagram of an aircraft of the invention;

FIG. 2 is a diagram showing a stationary tail fin carrying a movable airfoil;

FIG. 3 is a diagram showing a movable tail fin;

FIG. 4 is a diagram showing a cambered airfoil;

DETAILED DESCRIPTION OF THE INVENTION

Figure 5:
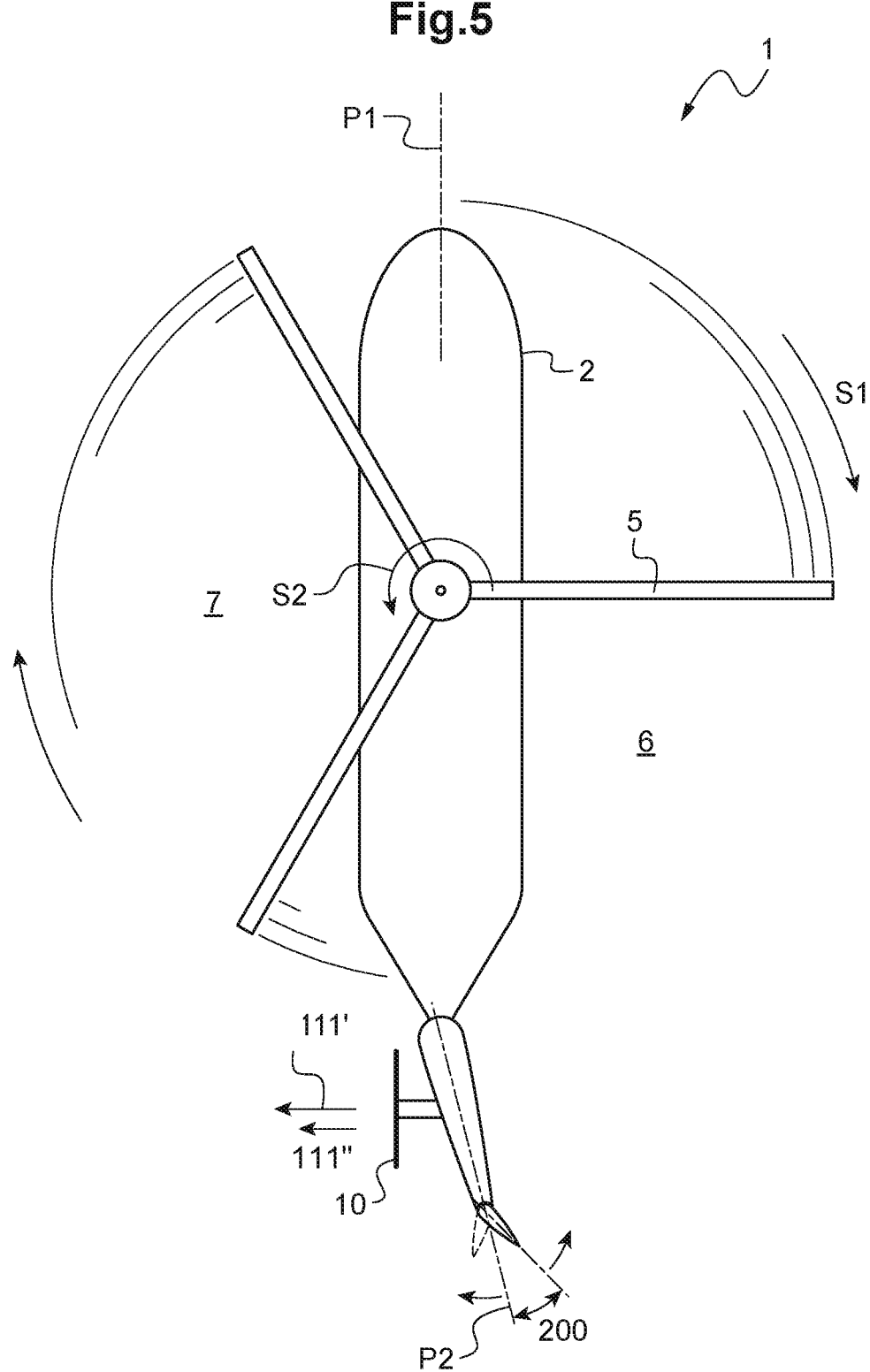
FIG. 5 is a diagram explaining the positioning of a movable airfoil having a positive deflection angle or a negative deflection angle.

Elements present in more than one of the figures are given the same references in each of them.

FIG. 1 shows a rotorcraft 1 having a fuselage 2. The fuselage 2 extends longitudinally along an anteroposterior plane of symmetry P1 from a nose 3 to a tail 4. The fuselage 2 also extends transversely from a first side 6 to a second side 7.

The fuselage 2 also has at least one main rotor 5 providing at least part of the lift and possibly also the propulsion of the rotorcraft 1.

The main rotor 5 has a plurality of blades performing rotary motion in a first direction S1. During this movement, one blade usually referred to as a "retreating" blade moves from the first side 6 towards the second side 7. Conversely, a blade usually referred to as the "advancing" blade moves from the second side 7 towards the first side 6.

This rotary motion of the main rotor gives rise to rotor torque in yaw on the fuselage 2 in a second direction S2 opposite to the first direction S1. The rotor torque then tends to change the yaw angle of the rotorcraft.

Under such conditions, the rotorcraft has at least one auxiliary rotor 10 for controlling the yaw movements of the rotorcraft.

The auxiliary rotor 10 is usually arranged at one of the longitudinal ends of the rotorcraft. Thus, the auxiliary rotor is arranged at the tail 4 of the rotorcraft, and in particular in a tail fin 20.

The auxiliary rotor may be an unducted rotor as shown in FIG. 1, or it may be a ducted rotor.

The auxiliary rotor 10 then generates lateral thrust 100. This lateral thrust 100 may be controlled using conventional control means 50, such as pedals.

In order to oppose the rotor torque, the lateral thrust is referred to as "positive" thrust 101, this positive thrust being directed towards the second side 7. The auxiliary rotor may also exert negative thrust 102 directed towards the first side 6.

In order to drive the main rotor 5 and the auxiliary rotor 10, the rotorcraft includes a power plant 90. The power plant 90 has at least one engine 91 and a main gearbox 92 that is interposed between the main rotor 5 and at least one engine 91.

The rotorcraft 1 also has a tail fin comprising at least in part a movable airfoil 25 that can be pivoted to generate adjustable transverse thrust 111, 112.

This airfoil 25 extends in elevation in a substantially vertical plane that presents an angle relative to the first plane P1.

In the variant of FIGS. 1 and 2, the rotorcraft 1 presents a stationary tail fin 20. The airfoil 25 then comprises a control surface 26 hinged to the stationary tail fin in order to represent said airfoil.

In the variant of FIG. 3, the rotorcraft has an airfoil comprising a movable tail fin. The tail fin is movable as a whole and represents said airfoil.

In a variant that is not shown, the rotorcraft has an airfoil including a movable tail fin, itself carrying a movable control surface.

In addition, and with reference to FIG. 4, the airfoil 25 may optionally include positive camber, the airfoil 25 presenting a cambered face 29 facing the second side 7.

Independently of the variant and with reference to FIG. 1, the airfoil 25 presents a deflection angle 200 that is zero when a reference chord of the airfoil 25 lies in a second plane P2. The airfoil is then in a middle position, and it may be deflected on either side of this middle position.

It can be understood that the manufacturer can perform tests or simulations to determine the appropriate amount of lift to be delivered when the airfoil is in the middle position so as to be located in the second plane P2.

The deflection angle is measured relative to a second plane P2. This second plane P2 may coincide with the first plane P1. Nevertheless, the second plane P2 may present a positive angle 300 relative to the first plane P1, as in the variant shown.

The airfoil may then be moved in order to present a deflection angle relative to the second plane P2.

By convention, the airfoil 25 presents a positive deflection angle when its trailing edge 27 moves away from the second plane P2 so as to be situated on the first side 6 of the rotorcraft, i.e. on the right-hand side of the second plane in FIG. 1. Conversely, the airfoil 25 presents a negative deflection angle when its trailing edge 27 moves away from the second plane P2 so as to be situated on the second side 7 of the rotorcraft, i.e. on the left-hand side of the second plane in FIG. 1.

In order to control the deflection angle, the rotorcraft 1 has a processor unit 30 that is connected to mover means 35 for causing the airfoil 25 to pivot.

The mover means 35 may comprise a hydraulic valve 36 communicating with the processor unit, and a hydraulic actuator 37 connected to the hydraulic valve 36 and to the airfoil 25. Alternatively, and by way of example, the mover means may comprise an electronic controller controlling an electromechanical actuator.

The processor unit 30 may include a processor 31 executing information stored in a non-volatile memory 32 for controlling the mover means.

Consequently, the processor unit 30 is connected to a first measurement system 41 for measuring a current value of a speed parameter V of the rotorcraft 1 and to a second measurement system 42 for measuring a current value of a power parameter W of the power plant 90.

The speed parameter V is selected from a list comprising at least: an air speed and a ground speed.

Furthermore, the power parameter is selected from a list comprising at least: total power developed by the engines 91 of the power plant; total torque generated by the engines 91 of the power plant; power transmitted to the main gearbox 92; torque transmitted to the main gearbox 92; and torque exerted on a mast 93 for driving the main rotor.

Depending on the method applied, the deflection angle of the airfoil is controlled with the help of the processor unit 30 and the mover means 35 as a function of a current value of a speed parameter V measured using the first measurement system and of a current value of a power parameter W measured using the second measurement system.

FIG. 5 explains the operation of the rotorcraft and the method that is applied.

According to the invention, the airfoil 25 is placed at a large negative deflection angle, e.g. during a stage of descending flight with the rotorcraft flying at high speed or in auto-rotation. A negative deflection angle is represented by the airfoil drawn in dashed lines.

With a negative deflection angle, the airfoil tends to reduce the lateral lift generated by the tail fin, as represented by vector 111". The vector 111" of this lateral thrust is directed towards the second side 7 and is short in length, and it may potentially be directed towards the first side in the event of thrust becoming negative. Conversely, the airfoil 25 is placed at a positive deflection angle 200 during a climbing stage of flight. A positive deflection angle is represented by the airfoil drawn in continuous lines.

With a positive deflection angle, the airfoil tends to increase the lateral lift generated by the tail fin by directing it towards the second side 7 in order to counter the rotor torque. More precisely, the vector 111' of this lateral thrust is directed towards the second side 7 and presents a length that is considerable. It is also possible to position the airfoil 25 at a small negative deflection angle during a stage of descending flight with the rotorcraft at low speed.

Furthermore, a first adjustment zone Z1 is defined in which the deflection angle is at a maximum and reaches a positive threshold angle δmax. This first zone Z1 is reached at a forward speed less than a speed referred to as a "third" speed V3.

In addition, a second zone Z2 is defined at which the deflection angle 200 is at a maximum and reaches a positive threshold angle δmax. This second zone Z2 is reached when the following two conditions are satisfied:

the forward speed of the rotorcraft is an intermediate forward speed lying between the third speed V3 and a "first" speed V1 that is greater than the third speed V3; and the power developed by the power plant is high, being greater than a "second" power W2.

The processor unit then positions the airfoil at this positive threshold angle δmax when the rotorcraft is flying in the first zone Z1 or the second zone Z2.

A third zone Z3 is also defined in which the deflection angle 200 is equal to a medium deflection, this third zone Z3 being reached at a high forward speed at high power. This medium deflection is close to zero, e.g. lying in the range minus 5 degrees to plus 5 degrees, and may possibly be equal to zero.

The processor unit then positions the airfoil at a medium orientation close to zero when the following two conditions are satisfied:

the forward speed of the rotorcraft is faster than a second speed V2 that is faster than the first speed V1; and the power developed by the power plant is greater than the second power W2.

A fourth zone Z4 is also defined in which the deflection angle 200 is small, reaching a negative threshold value δmin. This fourth zone Z4 is reached at a high forward speed and at low power developed by the power plant.

The processor unit then positions, the airfoil at a negative threshold value δmin when the following two conditions are satisfied:

the forward speed of the rotorcraft is faster than a fourth speed V4 lying between the first speed V1 and the third speed V3; and the power developed by the power plant is less than the first power W1.

By way of example, the processor unit controls the deflection of the airfoil 25 using a relationship L giving a target angle for the airfoil 25 as a function of the speed parameter V of the rotorcraft 1 and of the power parameter W. This relationship L may possibly correspond to the following equations:

$$\delta_1 = \begin{cases} V < V_1 \to \delta_{max} \\ V_1 \leq V < V_2 \to [sw] \cdot (A \cdot V + B) + \\ [\delta_{max} - [sw] \cdot (A \cdot V + B)] \cdot \left\{ 1 - \left[\sin\left(\frac{\pi}{2} \cdot \frac{V - V_1}{V_2 - V_1}\right)\right]^2 \right\} \\ V_2 \leq V \to [sw] \cdot (A \cdot V + B) \end{cases}$$

-continued $$\delta_2 = \begin{cases} W < W_1 \to \delta_{min} \\ W_1 \leq W < W_2 \to \delta_1 - [\delta_1 - \delta_{min}] \cdot \left\{ \left[ \sin\left(\frac{\pi}{2} \cdot \frac{W - W_2}{W_2 - W_1}\right) \right]^2 \right\} \\ W_2 \leq W \to \delta_1 \end{cases}$$

$$\delta = \begin{cases} V > V_4 \to \delta_2 \\ V_3 < V \leq V_4 \to \delta_{max} - \\ [\delta_{max} - \delta_2] \cdot \left\{ \left[ \sin\left(\frac{\pi}{2} \cdot \frac{V - V_3}{V_4 - V_3}\right) \right]^2 \right\} \\ V \leq V_3 \to \delta_{max} \end{cases}$$

where:

"δ" represents the target angle;

"δ1" and "δ2" represent calculation parameters;

"δmax" and "δmin" represent respectively the predetermined positive threshold angle and negative threshold angle;

"V1", "V2", "V3", and "V4" respectively represent first, second, third, and fourth speeds predetermined by the manufacturer;

"V" represents the current value of the speed parameter;

"W1" and "W2" respectively represent the first and the second predetermined powers;

"W" represents the current value of the power parameter;

"sw" represents a predetermined adjustment parameter; and

"A" and "B" represent variables that are functions of said adjustment parameter.

Figure 6:
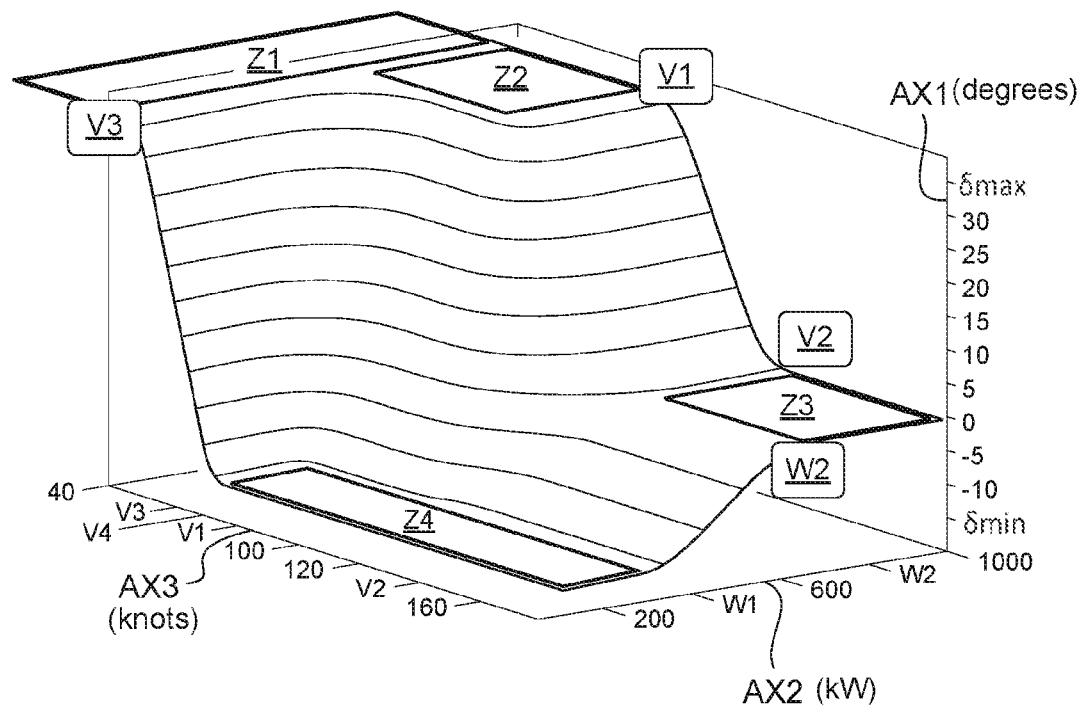
FIG. 6 is a diagram showing a first implementation.

In the implementation of FIG. 6, the adjustment parameter sw is equal to a predetermined value, e.g. 0. The deflection angle 200 is then equal to the target angle δ.

The relationship L then serves to define a sheet presenting the deflection angle plotted along a vertical first axis AX1, the power parameter W plotted along a horizontal second axis AX2, and the speed parameter plotted along a third axis AX3.

This sheet makes it possible to reach the first zone Z1, the second zone Z2, the third zone Z3, and the fourth zone Z4, together with transition areas between these zones.

The processor unit then applies the relationship L directly in order to determine the deflection angle.

Figure 7:
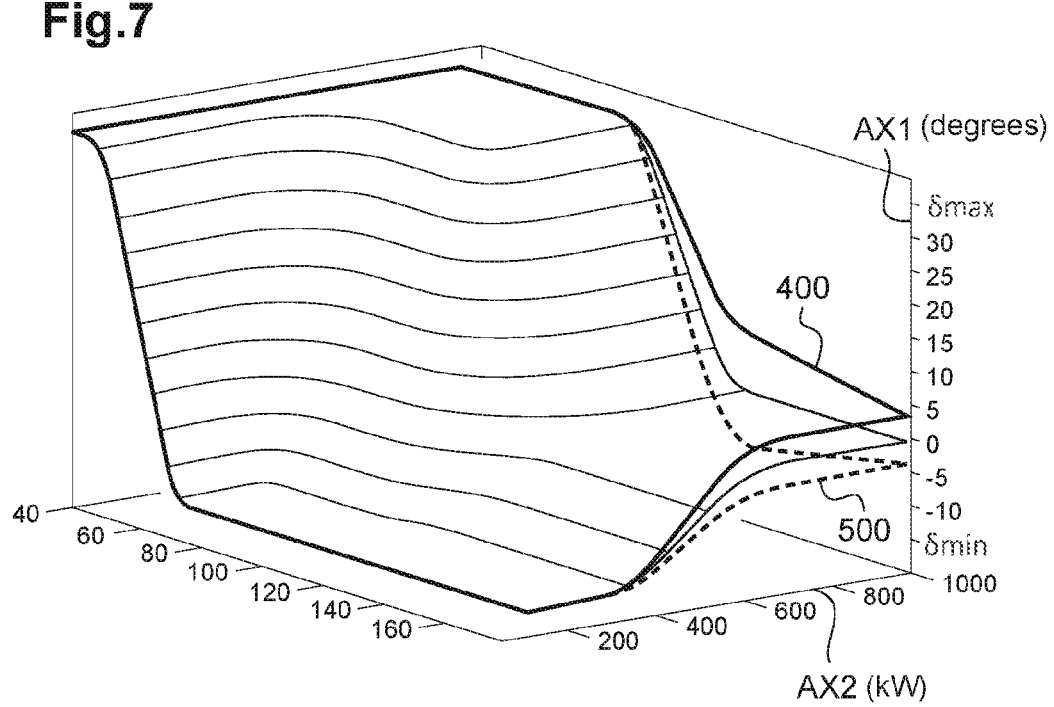
FIG. 7 is a diagram showing a second implementation.

FIG. 7 shows a second implementation.

In this second implementation, the processor unit determines a maximum angle 400 equal to the target angle in applying the relationship L while giving a first value to the adjustment parameter sw. The maximum angle 400 is then in the form of an upper sheet in FIG. 7.

Furthermore, the processor unit determines a minimum angle 500 equal to the target angle by applying the relationship L and giving a second value to the adjustment parameter sw. The minimum angle 500 then gives a sheet having the lower shape in FIG. 7.

These lower and upper sheets put limits on the deflection angle.

Under such circumstances, the current collective pitch of the blades 11 of the auxiliary rotor 10 is measured using a conventional pitch measurement device that is connected to the processor unit.

Thereafter, the processor unit controls means for modifying the pitch of the blades 11, such as an autopilot system. The processor unit then requests an increase in the deflection angle 200 of the airfoil 25 so as to cause it to tend towards the maximum angle 400 so long as said pitch is greater than a predetermined setpoint pitch.

Conversely, the processor unit requests a decrease in the deflection angle 200 of the airfoil 25 by causing it to tend towards the minimum angle 500 so long as said pitch is less than the predetermined setpoint pitch.

In parallel, the autopilot system automatically modifies said pitch in parallel with modification to the deflection angle 200, in order to compensate for the modification in the deflection angle.

The processor unit may optionally inhibit any modification to the deflection angle 200 whenever the pilot is operating the control means 50.

This implementation enables the airfoil to be controlled in a manner that is transparent for the pilot. Pilot action on the control means 50 then stops this implementation being performed so as to leave full authority to the pilot.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method for a rotorcraft, the rotorcraft extending longitudinally along a first anteroposterior plane (P1) separating a first side from a second side of the rotorcraft, the rotorcraft including a main rotor, an auxiliary rotor, and a power plant configured to drive the main rotor and the auxiliary rotor in rotation, wherein the auxiliary rotor is configured to exert lateral thrust in order to control yaw movement of the rotorcraft, the lateral thrust being directed towards the second side in order to counter torque generated by the main rotor on a fuselage of the rotorcraft, the rotorcraft further including a tail fin extending in elevation, wherein the tail fin is provided at least in part with a deflectable airfoil, wherein the airfoil is configured to generate transverse lift as a function of a deflection angle of the airfoil, wherein the airfoil has a trailing edge, wherein the deflection angle of the airfoil is at 0° when the trailing edge is present in a second plane (P2), wherein the deflection angle of the airfoil is negative relative to the second plane (P2) when the trailing edge is directed towards the second side, wherein the deflection angle of the airfoil is positive relative to the second plane (P2) when the trailing edge is directed towards the first side, wherein the deflection angle of the airfoil is controllable at least as a function of a current value of a speed parameter (V) of the rotorcraft and of a current value of a power parameter (W) of the power plant so as to enable the auxiliary rotor to be operated at a predetermined operating point in order to satisfy at least one of a performance target for the rotorcraft and an acoustic target for the auxiliary rotor, the method comprising:

receiving a first power threshold (W1) and a second power threshold (W2), wherein the second power threshold (W2) is greater than the first power threshold (W1);

receiving a first speed threshold (V1), a second speed threshold (V2), a third speed threshold (V3), and a fourth speed threshold (V4), wherein the second speed threshold (V2) is greater than the first speed threshold (V1) which is greater than the fourth speed threshold (V4) which is greater than the third speed threshold (V3);

controlling the deflection angle of the airfoil to reach a first zone (Z1) for which the deflection angle of the airfoil is at a maximum positive threshold angle (δmax)

relative to the second plane (P2), the first zone (Z1) being reached by the deflection angle of the airfoil when the current value of the speed parameter (V) of the rotorcraft is lower than the third speed threshold (V3);

controlling the deflection angle of the airfoil to reach a second zone (Z2) for which the deflection angle of the airfoil is at the maximum positive threshold angle (δmax) relative to the second plane (P2), the second zone (Z2) being reached by the deflection angle of the airfoil when the current value of the speed parameter (V) of the rotorcraft is greater than the fourth speed threshold (V4) and lesser than the first speed threshold (V1) and the current value of the power parameter (W) of the power plant is greater than the second power threshold (W2);

controlling the deflection angle of the airfoil to reach a third zone (Z3) for which the deflection angle of the airfoil is substantially 0° relative to the second plane (P2), the third zone (Z3) being reached by the deflection angle of the airfoil when the current value of the speed parameter (V) of the rotorcraft is greater than the second speed threshold (V2) and the current value of the power parameter (W) of the power plant is greater than the second power threshold (W2); and controlling the deflection angle of the airfoil to reach a fourth zone (Z4) for which the deflection angle of the airfoil is at the minimum negative threshold angle (δmin) relative to the second plane (P2), the fourth zone (Z4) being reached by the deflection angle of the airfoil when the current value of the speed parameter (V) of the rotorcraft is greater than the fourth speed threshold (V4) and the current value of the power parameter (W) of the power plant is lower than the first power threshold (W1).

2. The method according to claim 1, wherein the speed parameter (V) is selected from a list comprising an air speed and a ground speed.

3. The method according to claim 1, wherein the power plant includes at least one engine and a main gearbox interposed between the at least one engine and the main rotor, the method further comprising:

selecting the power parameter from a list comprising: total power developed by the at least one engine; total torque generated by the at least one engine; power transmitted to the main gearbox; torque transmitted to the main gearbox; and torque exerted on a mast driving the main rotor.

4. The method according to claim 1, wherein the second plane (P2) is inclined relative to the first anteroposterior plane (P1) so that the second plane (P2) presents a positive angle relative to the first anteroposterior plane (P1), the trailing edge being directed towards the first side when the airfoil is present in the second plane (P2).

5. The method according to claim 1, further comprising using a relationship (L) in controlling the deflection of the airfoil, the relationship (L) providing a target angle (δ) for the deflection angle of the airfoil as a function of the speed parameter (V) of the rotorcraft and of the power parameter (W) of the power plant.

6. The method according to claim 5, wherein the auxiliary rotor has a plurality of blades, wherein the first zone (Z1), the second zone (Z2), the third zone (Z3) and the fourth zone (Z4) define a first sheet, the method further comprising:

determining a maximum angle for the target angle in the application of the relationship (L) to define an upper sheet that is different from the first sheet;

determining a minimum angle for the target angle in the application of the relationship (L) to define a lower sheet that is different from the first sheet and the upper sheet;

measuring the current collective pitch of the blades of the auxiliary rotor;

increasing the deflection angle of the airfoil by causing the deflection angle of the airfoil to move towards the maximum angle so long as the collective pitch is greater than a predetermined setpoint collective pitch, the deflection angle of the airfoil being limited to be less than or equal to the maximum angle;

decreasing the deflection angle of the airfoil by causing the deflection angle of the airfoil to move towards the minimum angle so long as the collective pitch is less than the predetermined setpoint collective pitch, the deflection angle of the airfoil being limited to be greater than or equal to the minimum angle; and automatically modifying the collective pitch in parallel with modifying the deflection angle of the airfoil.

7. The method according to claim 6, wherein the rotorcraft includes means for controlling the collective pitch manually, and modification to the deflection angle of the airfoil is inhibited whenever a pilot is operating the control means.

8. A rotorcraft comprising:

a fuselage extending longitudinally along a first anteroposterior plane (P1) separating a first side from a second side of the rotorcraft;

a main rotor;

an auxiliary rotor;

a power plant configured to drive the main rotor and the auxiliary rotor in rotation;

wherein the auxiliary rotor is configured to exert lateral thrust that is controllable in order to control yaw movement of the rotorcraft, the lateral thrust being directed towards the second side in order to counter torque generated by the main rotor on the fuselage of the rotorcraft;

a tail fin extending in elevation and provided at least in part with a deflectable airfoil of controllable deflection, wherein the airfoil is configured to generate transverse lift as a function of a deflection angle of the airfoil, wherein the airfoil has a trailing edge, wherein the deflection angle of the airfoil is at 0° when the trailing edge is present in a second plane (P2), negative relative to the second plane (P2) when the trailing edge is directed towards the second side, and positive relative to the second plane (P2) when the trailing edge is directed towards the first side;

a processor unit configured receive a first power threshold (W1) and a second power threshold (W2), wherein the second power threshold (W2) is greater than the first power threshold (W1);

the processor unit configured to receive a first speed threshold (V1), a second speed threshold (V2), a third speed threshold (V3), and a fourth speed threshold (V4), wherein the second speed threshold (V2) is greater than the first speed threshold (V1) which is greater than the fourth speed threshold (V4) which is greater than the third speed threshold (V3);

the processor unit connected to mover means for causing the airfoil to pivot, the processor unit being connected to a first measurement system configured to measure a current value of a speed parameter (V) of the rotorcraft and to a second measurement system configured to measure a current value of a power parameter (W) of the power plant, the processor unit configured to cause the airfoil to pivot to:

a first zone (Z1) for which the deflection angle of the airfoil is at a maximum positive threshold angle ($\delta$max) relative to the second plane (P2), the first zone (Z1) being reached by the deflection angle of the airfoil when the current value of the speed parameter (V) of the rotorcraft is lower than the third speed threshold (V3);

a second zone (Z2) for which the deflection angle of the airfoil is at the maximum positive threshold angle ($\delta$max) relative to the second plane (P2), the second zone (Z2) being reached by the deflection angle of the airfoil when the current value of the speed parameter (V) of the rotorcraft is greater than the fourth speed threshold (V4) and lesser than the first speed threshold (V1) and the current value of the power parameter (W) of the power plant is greater than the second power threshold (W2);

a third zone (Z3) for which the deflection angle of the airfoil is substantially 0° relative to the second plane (P2), the third zone (Z3) being reached by the deflection angle of the airfoil when the current value of the speed parameter (V) of the rotorcraft is greater than the second speed threshold (V2) and the current value of the power parameter (W) of the power plant is greater than the high second power threshold (W2); and a fourth zone (Z4) for which the deflection angle of the airfoil is at the minimum negative threshold angle ($\delta$min) relative to the second plane (P2), the fourth zone (Z4) being reached by the deflection angle of the airfoil when the current value of the speed parameter (V) of the rotorcraft is greater than the fourth speed threshold (V4) and the current value of the power parameter (W) of the power plant is lower than the first power threshold (W1).

9. The rotorcraft according to claim 8, wherein the tail fin is one of a tail fin constituted entirely by the airfoil, a stationary tail fin provided with at least one movable control surface representing the airfoil, or a movable tail fin having at least one movable control surface together representing the airfoil.

10. The rotorcraft according to claim 8, wherein the second plane (P2) presents a positive angle relative to the first anteroposterior plane, the trailing edge being directed towards the first side when the airfoil is present in the second plane.

11. The rotorcraft according to claim 8, wherein the airfoil has a positive camber presenting a cambered face directed towards the second side.

12. The rotorcraft according to claim 8, wherein the auxiliary rotor includes a plurality of blades, wherein the rotorcraft includes manual control means for controlling the collective pitch of the blades of the auxiliary rotor, and the control means are in communication with the processor unit.

* * * * *